(12) United States Patent
Karasawa

(10) Patent No.: US 10,112,273 B2
(45) Date of Patent: Oct. 30, 2018

(54) APPARATUS FOR TAKING OUT FLATTENED TUBE FINS

(71) Applicant: HIDAKA SEIKI KABUSHIKI KAISHA, Tokyo (JP)

(72) Inventor: Masanao Karasawa, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/525,649

(22) PCT Filed: Feb. 6, 2015

(86) PCT No.: PCT/JP2015/053428
§ 371 (c)(1),
(2) Date: May 10, 2017

(87) PCT Pub. No.: WO2016/125309
PCT Pub. Date: Aug. 11, 2016

(65) Prior Publication Data
US 2017/0334028 A1 Nov. 23, 2017

(51) Int. Cl.
*B65G 47/90* (2006.01)
*B65G 47/82* (2006.01)
(Continued)

(52) U.S. Cl.
CPC .............. *B23P 15/26* (2013.01); *B65G 59/06* (2013.01); *F28F 1/30* (2013.01); *F28F 2215/12* (2013.01)

(58) Field of Classification Search
CPC .. B65G 47/90; B65G 2201/025; B65G 61/00; B65G 59/06; B65H 2405/50;
(Continued)

(56) References Cited

U.S. PATENT DOCUMENTS

| 4,400,124 A * | 8/1983 | Greller | B65H 31/02 271/209 |
| 5,393,196 A * | 2/1995 | Bluemle | B07C 1/025 198/740 |

(Continued)

FOREIGN PATENT DOCUMENTS

| CN | 101574724 A | 11/2009 |
| CN | 103706728 A | 4/2014 |

(Continued)

OTHER PUBLICATIONS

International Search Report, issued in PCT/JP2015/053428 (PCT/ISA/210), dated Mar. 17, 2015.
(Continued)

*Primary Examiner* — Gregory W Adams
(74) *Attorney, Agent, or Firm* — Birch, Stewart, Kolasch & Birch, LLP

(57) ABSTRACT

When taking out flattened tube fins that have been stacked in a stacker apparatus from the stacker apparatus while maintaining the stacked state, an apparatus is provided for taking out the stacked flattened tube fins from the stacker apparatus that stacks the flattened tube fins having cutaway portions into which flattened tubes are inserted. The apparatus includes a first member including a base plate and an erected portion, a second member that is disposed at a position facing the first member and together with the first member clamps the flattened tube fins, and a moving mechanism that causes the first member and the second member to move toward and away from the flattened tube fins on the stacker apparatus and moves the flattened tube fins and the stacker apparatus apart while the flattened tube fins of the stacker apparatus are clamped by the first member and the second member.

3 Claims, 10 Drawing Sheets

(51) Int. Cl.
*B23P 15/26* (2006.01)
*B65G 59/06* (2006.01)
*F28F 1/30* (2006.01)

(58) Field of Classification Search
CPC ............ B25J 15/0014; B25J 15/0253; B25J 15/0095; F28D 1/05366; B23P 15/26; F28F 2215/12; F28F 1/30
USPC ............ 108/53.1; 206/454, 493, 509, 513; 211/49.1, 51; 229/120.33; 269/296; 271/221; 294/67.33; 403/33; 410/31, 410/32, 33; 414/26, 788.9, 789, 789.9, 414/790, 790.1, 790.2, 790.3
See application file for complete search history.

(56) References Cited

U.S. PATENT DOCUMENTS

| | | | | |
|---|---|---|---|---|
| 5,630,697 | A * | 5/1997 | Black, Jr. | ............ B65B 27/02 198/431 |
| 6,290,452 | B1 * | 9/2001 | Wachter | ............ B65H 1/30 414/626 |
| 6,305,728 | B1 * | 10/2001 | Holter | ............ B25J 15/0253 294/3 |
| 7,914,729 | B2 * | 3/2011 | Boersma | ............ B25B 5/163 266/65 |
| 7,938,614 | B2 * | 5/2011 | Fritzsche | ............ B65G 57/06 414/622 |
| 2014/0090238 | A1 | 4/2014 | Karasawa et al. | |
| 2015/0314455 | A1 * | 11/2015 | Morency | ............ B25J 15/0014 414/799 |
| 2016/0153724 | A1 * | 6/2016 | Nakajima | ............ F25B 39/00 165/172 |

FOREIGN PATENT DOCUMENTS

| | | |
|---|---|---|
| JP | 2003-320433 A | 11/2003 |
| JP | 2008-183713 A | 8/2008 |
| JP | 2010-188506 A | 9/2010 |
| JP | 2014-73510 A | 4/2014 |

OTHER PUBLICATIONS

Chinese Office Action and Search Report, dated Jul. 26, 2018 for Chinese Application No. 201580075606.4, with an English translation of the Chinese Office Action.

* cited by examiner

FIG.2A
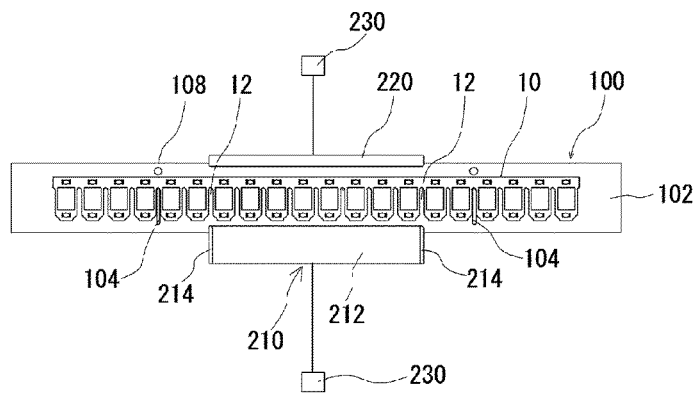
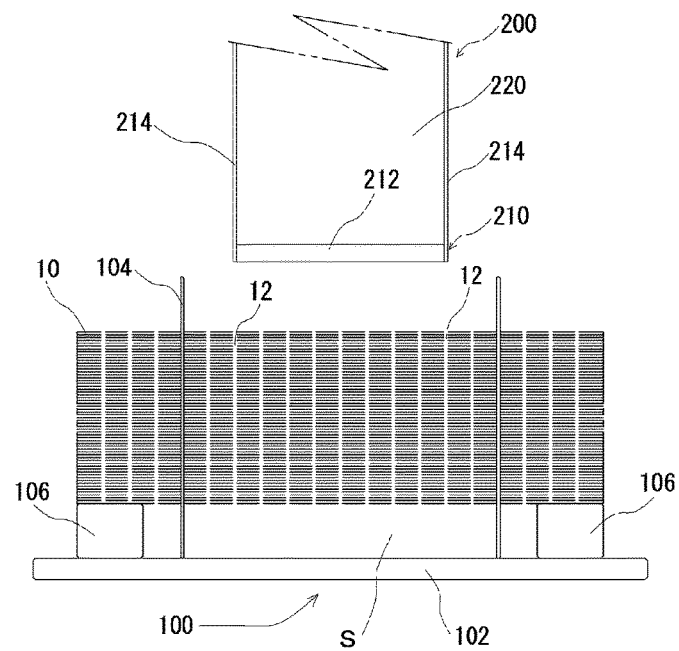
FIG.2B
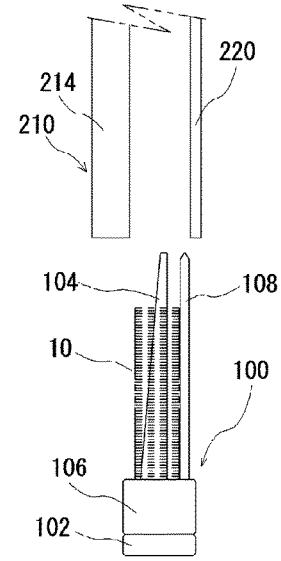
FIG.2C

FIG.3A
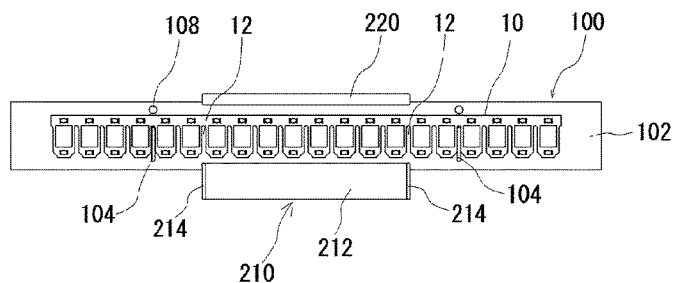
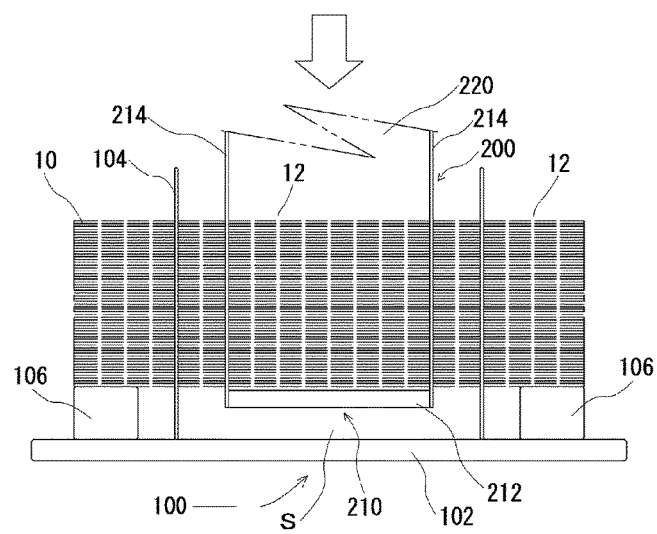 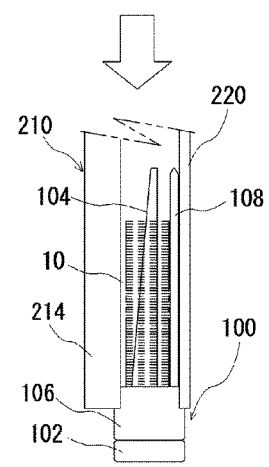
FIG.3B            FIG.3C

FIG.4A
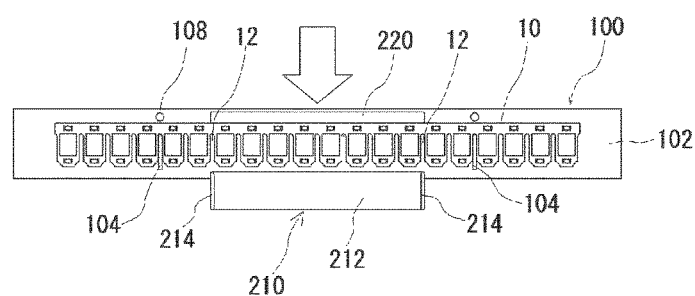
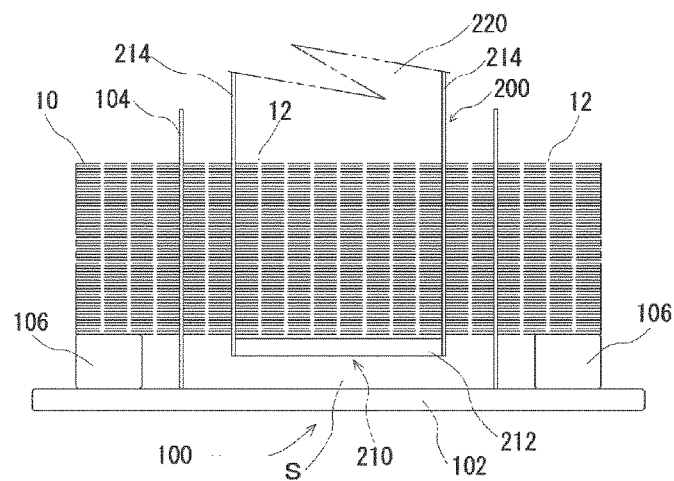
FIG.4B
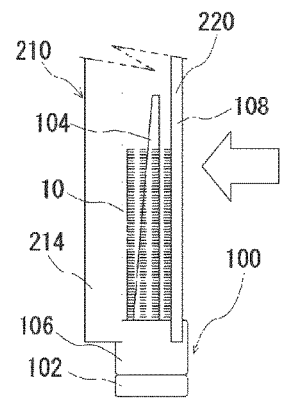
FIG.4C

FIG.5A
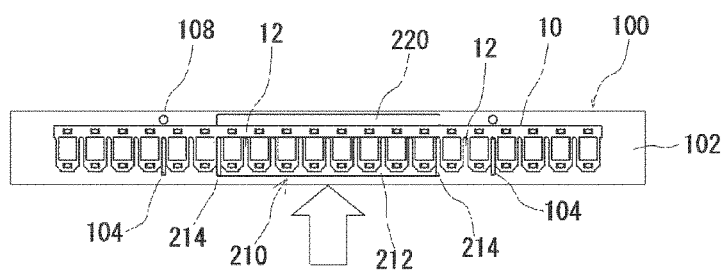
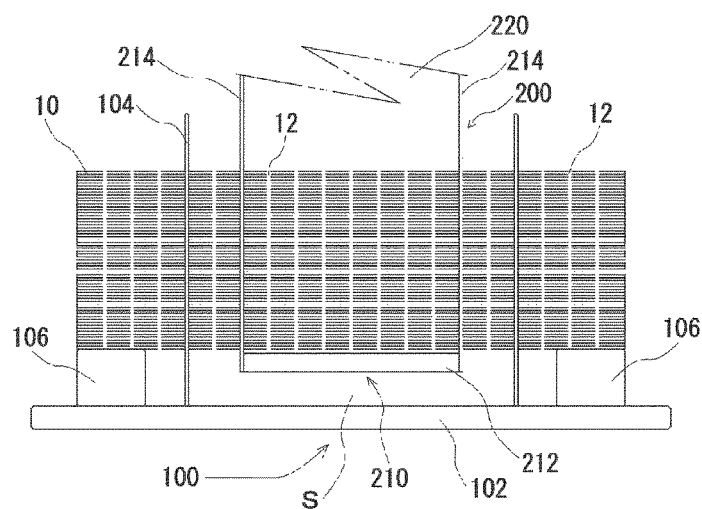
FIG.5B
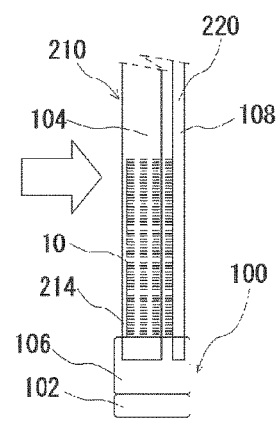
FIG.5C

FIG.6A
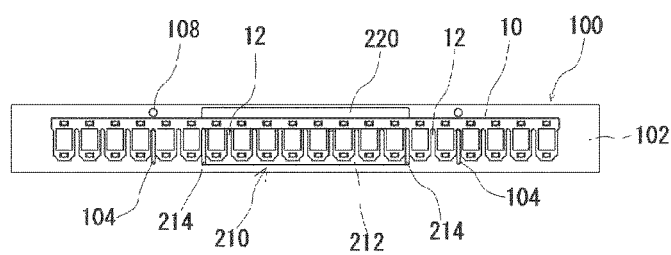
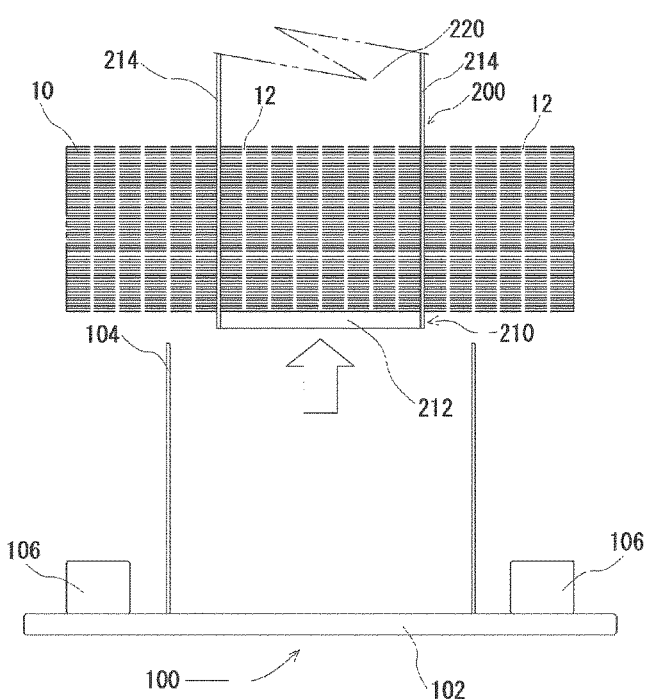
FIG.6B
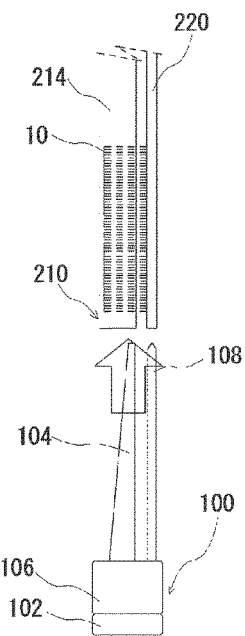
FIG.6C

90° ROTATION

APPARATUS FOR TAKING OUT FLATTENED TUBE FINS

TECHNICAL FIELD

The present invention relates to an apparatus for taking out flattened tube fins that takes out flattened tube fins, which are stacked and held on a stacker apparatus, from the stacker apparatus while maintaining the stacked state.

BACKGROUND ART

A heat exchanger, such as an air conditioner, includes tubes for supplying a cooling medium and heat exchanger fins for increasing the surface area of the tubes. Such heat exchanger fins are manufactured by integrally assembling the tubes and the heat exchanger fins that have been manufactured separately. As a manufacturing apparatus of such heat exchanger fins, a configuration such as that disclosed in PTL1 is known.

The manufacturing apparatus for a heat exchanger disclosed in PTL1 manufactures a heat exchanger by arranging a plurality of tubes at predetermined intervals so as to be parallel, disposing heat exchanger fins between the tubes, and fixing the heat exchanger fins and the tubes to one another.

CITATION LIST

Patent Literature

PTL1: Japanese Laid-open Patent Publication No. 2008-183713

SUMMARY OF INVENTION

Technical Problem

Aside from the configuration of the heat exchanger disclosed in Patent Document 1, a heat exchanger of a configuration that uses flattened tubes that are formed in a flattened shape and flattened tube fins as heat exchanger fins and is assembled so that the flattened tubes and the flattened tube fins intersect one another (so that the flattened tube fins are skewered by the flattened tubes) is also provided. When assembling a heat exchanger in this way in a state where the flattened tubes and the flattened tube fins intersect, since cutaway portions for attaching the flattened tubes are formed in the flattened tube fins, it is favorable to assemble the flattened tubes with flattened tube fins that have been stacked in the thickness direction. However, the reality is that a favorable manufacturing apparatus for a heat exchanger for use when performing assembly in this way has not been provided.

Solution to Problem

The present invention was conceived to solve the problem described above and has an object of providing an apparatus for taking out flattened tube fins which, by taking out a plurality of flattened tube fins that are stacked on a stacker apparatus from the stacker apparatus while maintaining the stacked state, can be favorably used when performing assembly by passing flattened tubes through the flattened tube fins.

As a result of intensive research into solving the above problem, the present inventors conceived the configuration described below which is capable of solving the problem. That is, the present invention is an apparatus for taking out flattened tube fins that takes out stacked flattened tube fins, in which a plurality of cutaway portions, into which flattened tubes used for heat exchanging are inserted, are funned from one side toward another side in a width direction, from a stacker apparatus, the stacker apparatus stacking the flattened tube fins and including a base portion, stacker pins that are erected on an upper surface of the base and inserted through the cutaway portions, and a stacking start position regulating portion for stacking the flattened tube fins from a position that is separated from an upper surface of the base portion, the apparatus for taking out flattened tube fins including: a first member including a base plate and an erected portion that is erected on the base plate in a state where the erected portion is positioned at at least an opening-side position of a cutaway portion, out of any of the cutaway portions aside from positions of the stacker pins; a second member disposed at a position that faces the first member with the flattened tube fins stacked in the stacker apparatus in between and together with the first member clamps the flattened tube fins stacked on the stacker apparatus; and a moving mechanism that causes the first member and the second member to move toward and away from the flattened tube fins stacked on the stacker apparatus and moves the flattened tube fins and the stacker apparatus apart in a state where the flattened tube fins stacked on the stacker apparatus are clamped by the first member and the second member.

By using the above configuration, it is possible to efficiently take a plurality of flattened tube fins, in a state where the flattened tube fins are stacked along stacker pins of a stacker apparatus, out of the stacker apparatus while maintaining the stacked state.

It is also preferable for the moving mechanism to clamp the flattened tube fins stacked on the stacker apparatus between the first member and the second member by moving the first member so that the base plate advances into a position between the base and the stacking start position regulating portion and the erected portion advances into an opening-side position of a cutaway portion and by moving the second member in a direction that approaches the first member, and to then move the first member and the second member along a direction in which the stacker pins are erected.

With this configuration, it is possible to hold the flattened tube fins in the stacked state on the stacker apparatus from the cutaway portions and the bottom surface of the flattened tube fins, which makes the stacked state even less likely to collapse and makes it possible to stably take out the flattened tube fins in a stacked state from the stacker apparatus.

It is also preferable for the apparatus to further include an accumulating unit including at least two guides that are positioned at formation positions of the cutaway portions of the flattened tube fins, are capable of advancing into the cutaway portions, and are disposed at positions that do not interfere with the erected portion, and for the moving mechanism to move the flattened tube fins clamped between the first member and the second member in a stacked state to a position of the accumulating unit, to cause the flattened tube fins to rotate so that opening sides of the cutaway portions of the flattened tube fins face the guides so as to allow the guides to advance into the cutaway portions of the flattened tube fins clamped in the stacked state by the first member and the second member and to cause the guides to advance into the cutaway portions of the flattened tube fins and then cause the first member and the second member to relatively move apart.

With the above configuration, it is possible to accumulate flattened tube fins in the stacked state that have been taken out of the stacker apparatus on the accumulating unit while maintaining the stacked state. By doing so, since it is possible, after the flattened tube fins in the stacked state have been taken out a plurality of times, to hold all of the flattened tube fins in an aligned state when advancing to the next process, it is possible to supply the flattened tube fins in a suitable state to a following process, such as a process that assembles the flattened tube fins and flattened tubes.

Advantageous Effects of Invention

According to the present invention, it is possible to take a plurality of flattened tube fins that are stacked on the stacker apparatus out of the stacker apparatus while maintaining the stacked state. This means that it is possible to efficiently perform a subsequent process which is an assembly process for the flattened tube fins and flattened tubes.

BRIEF DESCRIPTION OF DRAWINGS

FIG. 2A to FIG. 2C are diagrams useful in explaining an operation of an apparatus for taking out flattened tube fins according to a first embodiment.

FIG. 3A to FIG. 3C are diagrams useful in explaining the operation of the apparatus for taking out flattened tube fins according to the first embodiment.

FIG. 4A to FIG. 4C are diagrams useful in explaining the operation of the apparatus for taking out flattened tube fins according to the first embodiment.

FIG. 5A to FIG. 5C are diagrams useful in explaining the operation of the apparatus for taking out flattened tube fins according to the first embodiment.

FIG. 6A to FIG. 6C are diagrams useful in explaining the operation of the apparatus for taking out flattened tube fins according to the first embodiment.

DESCRIPTION OF EMBODIMENTS

Figure 1A:
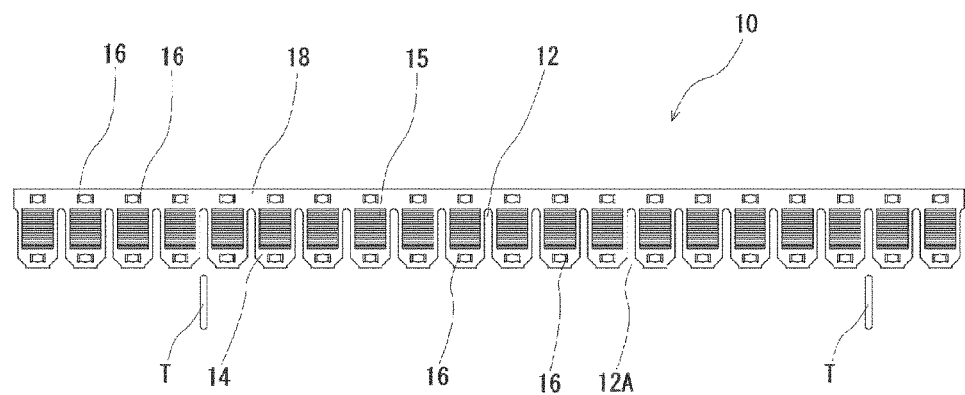
FIG. 1A is a plan view of a flattened tube fin according to the embodiments.
Figure 1B:
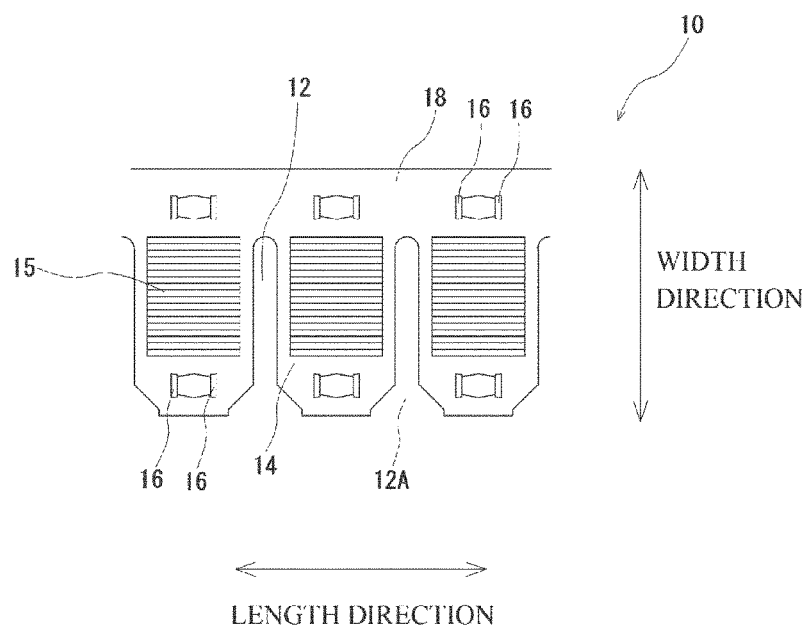
FIG. 1B is an enlarged plan view of a principal part of a flattened tube fin.

The overall manufacturing process of a flattened tube fin 10 handled in the present embodiments will now be described. FIG. 1A and FIG. 1B are diagrams useful in explaining a flattened tube fin used in the present embodiments. FIG. 1A is a plan view depicting an entire flattened tube fin and FIG. 1B is an enlarged plan view of a principal part of a flattened tube fin.

A flattened tube fin 10 like that depicted in FIG. 1A and FIG. 1B is formed by press machining a thin plate of metal, such as aluminum. The thin metal plate used as a raw material of the flattened tube fin 10 is supplied in a state where the metal plate has been wound into a coil. After being fed out by a feeder, the thin metal plate is intermittently conveyed to a press apparatus by a conveying apparatus. After being machined (pressed) into a predetermined shape by a mold apparatus provided inside the press apparatus (neither apparatus is illustrated), the thin metal plate is formed into metal strips of the product width by splitting the thin metal plate into product widths. The metal strips of product width are divided into lengths of a size that is set in advance in the conveying direction to form the flattened tube fins 10, which are then stacked and held in a stacker apparatus.

As depicted in FIG. 1A and FIG. 1B, cutaway portions 12, into which flattened tubes T for supplying coolant for heat exchanging are inserted, are formed in the flattened tube fin 10. The cutaway portions 12 are formed at a plurality of positions that are separated by predetermined intervals along the length direction of the flattened tube fin 10. Plate-like portions 14 are formed between the cutaway portions 12 of the flattened tube fin 10, and a louver 15 is formed on each plate-like portion 14. Folded-up portions 16 formed by cutting and folding up parts of the plate-like portions 14 are formed at both ends in the width direction of the louvers 15. As should be clear from FIG. 1A and FIG. 1B, two folded-up portions 16 are formed for one louver 15 on the flattened tube fin 10 according to the present embodiment.

The cutaway portions 12 are formed from only one side in the width direction of each flattened tube fin 10. Accordingly, the plate-like portions 14 are joined in the length direction by a joining portion 18 that extends along the length direction. On the flattened tube fin 10 according to the present embodiment, out of the folded-up portions 16 for one louver 15, the folded-up portion 16 on one side is formed at the front end of a plate-like portion 14 (an opening 12A side of the cutaway portions 12) and the other folded-up portion 16 is formed at a position on the joining portion 18. Note that although an arrangement where the flattened tubes T that are to advance into the cutaway portions 12 are disposed at only two positions is depicted in FIG. 1A and FIG. 1B to simplify the drawings, the flattened tubes T are inserted into all of the cutaway portions 12.

A predetermined number of the flattened tube fins 10 formed in this way are stacked and held in the thickness direction in a stacker apparatus 100 depicted in FIGS. 2A to 2C.

First Embodiment

The configuration of an apparatus 200 for taking out flattened tube fins according to the present embodiment will now be described with reference to FIGS. 2A to 2C. FIG. 2A is a plan view, FIG. 2B is a front view, and FIG. 2C is a right side view. When not indicated otherwise, the symbols A, B, and C in the drawings from FIGS. 3A to 3C onwards have the same meaning as FIGS. 2A to 2C.

As depicted in FIGS. 2A to 2C, the stacker apparatus 100 in which the flattened tube fins 10 according to the present embodiment are stacked and held includes a base 102 composed of a flat plate, stacker pins 104 and guide pins 108 that are erected on the upper surface of the base 102, and spacers 106 as stacking start position restricting portions that ensure that the flattened tube fins 10 are stacked along the stacker pins 104 with a predetermined interval provided from the upper surface of the base 102.

The stacker pins 104 are formed so as to be capable of advancing into the cutaway portions 12 from the openings 12A of the cutaway portions 12 of the flattened tube fins 10. The spacers 106 according to the present embodiment are disposed at positions that are outside the two stacker pins 104 when the stacker apparatus 100 is viewed from in front. Note that when three or more stacker pins 104 are erected on the base 102, it is preferable for the spacer 106 to be disposed on the outside of the stacker pins 104 erected at both end positions.

The guide pins 108 contact end edges of the joining portions 18 of the flattened tube fins 10 and act together with the stacker pins 104 to position the flattened tube fins 10 in the plane of the flattened tube fins 10 above the base 102. The stacker pins 104 and the guide pins 108 are disposed at the same positions in the length direction of the flattened tube fins 10.

In the stacker apparatus 100 of this configuration, a plurality of flattened tube fins 10 that have been manufactured by a manufacturing apparatus for heat exchanger fins, not illustrated, are stacked and held in the height direction of the stacker pins 104 with upper surface positions of the spacers 106 as stacking start positions. The stacker apparatus 100 according to the present embodiment has a gap S with the same height as the height of the spacers 106 formed between the lowest surface of the plurality of flattened tube fins 10 that are stacked and held and the upper surface of the base 102.

After a predetermined number of flattened tube fins 10 have been stacked and held in the stacker apparatus 100 described above, the flattened tube fins 10 are taken out of the stacker apparatus 100 by the apparatus 200 for taking out flattened tube fins while maintaining the stacked state.

As depicted in FIGS. 2A to 2C, the apparatus 200 for taking out flattened tube fins according to the present embodiment includes a first member 210, a second member 220, and a moving mechanism 230 for moving the first member 210 and the second member 220.

The first member 210 includes a base plate 212 and erected portions 214 that are erected on an upper surface of the base plate 212.

The base plate 212 is formed so as to have a narrower width than the inner width of the two stacker pins 104 erected on the stacker apparatus 100 and so as to be thinner than the height of the spacers 106 (the height of the spacers S) of the stacker apparatus 100. Here, both end positions in the width direction of the base plate 212 and the positions of any two of the cutaway portions 12, out of the cutaway portions 12 formed in the flattened tube fins 10 stacked and held in the stacker apparatus 100, through which the stacker pins 104 have not been passed are set so as to match.

The erected portions 214 are erected at both end positions in the width direction of the base plate 212. The width of the erected portions 214 is formed so as to be equal to or narrower than the width of the cutaway portions 12 of the flattened tube fins 10. In addition, it is preferable to form the erected portions 214 with the same shape when viewed from above as the shape of the cutaway portions 12 when viewed from above. As depicted in FIG. 2B, the first member 210 is formed in a U shape (in the form of an open-topped channel) when viewed from in front.

The second member 220 is disposed at a position facing the first member 210 with the flattened tube fins 10 stacked and held in the stacker apparatus 100 in between, and is provided so as to be capable of acting together with the first member 210 and the erected portions 214 of the first member 210 to clamp the plurality of flattened tube fins 10 that are being stacked and held. The second member 220 in the present embodiment is formed of a flat plate with the same width as the base plate 212 of the first member 210 and the same height as the erected height of the erected portions 214 of the first member 210 and is disposed so as to not interfere with the guide pins 108 of the stacker apparatus 100. The second member 220 extends in the stacking direction of the flattened tube fins 10 along the joining portion 18 of the flattened tube fins 10 that are stacked and held in the stacker apparatus 100, and it is sufficient for the second member 220 to act together with the first member 210 to clamp the flattened tube fins 10 that are stacked and held in the stacker apparatus 100. Accordingly, there are no particular limitations on the shape of the second member 220.

The first member 210 and the second member 220 are provided so as to be capable of being moved by the moving mechanism 230. The moving mechanism 230 is configured so as to be capable of moving the first member 210 and the second member 220 so as to at least move toward and away from the flattened tube fins 10 stacked and held in the stacker apparatus 100. Here, a separate moving mechanism 230 is provided for each of the first member 210 and the second member 220.

The moving mechanism 230 in the present embodiment makes it possible for the first member 210 and the second member 220 to move toward and away in the width direction of the flattened tube fins 10 stacked and held in the stacker apparatus 100 and to also move in the stacking direction of the flattened tube fins 10. Note that as the moving mechanism 230, as examples, it is possible to use a fluid driving apparatus or a motor driving apparatus or a combination of such driving apparatuses, with it being preferable to use air as the fluid and to use a servo motor as the motor.

The respective operations of the apparatus 200 for taking out flattened tube fins and the stacker apparatus 100 described above are controlled by a control unit, not illustrated. As one example of this control unit, it is possible to use an arrangement including a CPU, which is a control means, and a storage means, in which a control program referred to by the control means is stored. The control unit may be disposed independently of the apparatus 200 for taking out flattened tube fins but can also be integrally incorporated in an operation control unit for controlling the operations of a manufacturing apparatus for flattened tube fins, not illustrated.

Next, the operation of the apparatus 200 for taking out flattened tube fins according to the present embodiment will be described with reference to FIGS. 2A to 2C, FIGS. 3A to 3C, FIGS. 4A to 4C, FIGS. 5A to 5C, FIGS. 6A to 6C, FIG. 7A, FIG. 7C, FIG. 8A, FIG. 8C, FIG. 9A, FIG. 9C, FIG. 10A, FIG. 10C, FIG. 11A, and FIG. 11C. Note that to simplify the drawings, the configuration of the moving mechanism 230 is depicted in FIG. 2A to FIG. 2C only. The moving mechanism 230 is not illustrated in the drawings from FIG. 3A to FIG. 3C onward. As depicted in FIG. 2A to FIG. 2C, when a number, set in advance, of flattened tube fins 10 are stacked and held in the stacker apparatus 100, a control unit, not illustrated, operates the moving mechanism 230 so that the first member 210 and the second member 220 move toward the plurality of flattened tube fins 10 stacked and held in the stacker apparatus 100 from standby positions depicted in FIG. 2A to FIG. 2C.

More specifically, as depicted by the arrows in FIGS. 3B and 3C, the control unit controls the operation of the moving mechanism 230 so as to position the base plate 212 of the first member 210 at a gap S between the upper surface of the base 102 and a lowest surface of the plurality of flattened tube fins 10 that are stacked and held and to make the erected positions of the erected portions 214 face the positions of any two of the cutaway portions 12 where the stacker pins 104 have not been passed through. The control unit controls the operation of the moving mechanism 230 so that the second member 220 moves toward the joining portions 18 of the flattened tube fins 10 stacked and held at the same time as a movement operation of the first member 210 or before or after such movement operation to place the bottom end position of the second member 220 below a lowest surface position of the plurality of flattened tube fins 10 that are stacked and held.

Note that as depicted in FIGS. 2A to 2C, the standby position of the first member 210 may be a position where positions in the width direction of the erected portions 214 of the first member 210 (the width direction when the stacker apparatus 100 is viewed from in front) have been aligned with the positions of the cutaway portions 12 into which the erected portions 214 are to advance.

As depicted in FIG. 3A to FIG. 3C, after the first member 210 and the second member 220 have reached predetermined positions in the height direction and the width direction, the control unit uses the moving mechanism 230 to bring the second member 220 into contact with the joining portions 18 of the flattened tube fins 10 as depicted by the arrows in FIG. 4A to FIG. 4C.

Next, the control unit controls the operation of the moving mechanism 230 so that first member 210 moves toward the second member 220 as depicted by the arrows in FIGS. 5A to 5C and the erected portions 214 of the first member 210 advance into the cutaway portions 12 of the flattened tube fins 10. As described earlier, since the parts of the erected portions 214 in the present embodiment that advance into the cutaway portions 12 are formed with the same shape when viewed from above as the shape of the cutaway portions 12 when viewed from above, the flattened tube fins 10 that are stacked and held in the stacker apparatus 100 become reliably clamped in the width direction of the flattened tube fins 10 by the first member 210 and the second member 220.

Next, as depicted by the arrows in FIG. 6A to 6C, the control unit controls the operation of the moving mechanism 230 so that the first member 210 and the second member 220 move in a synchronized state in the direction (height direction) in which the stacker pins 104 are erected. At this time, the flattened tube fins 10 are taken out from the stacker apparatus 100 with the state where the flattened tube fins 10 are stacked and held in the stacker apparatus 100 being maintained.

Figure 7A:
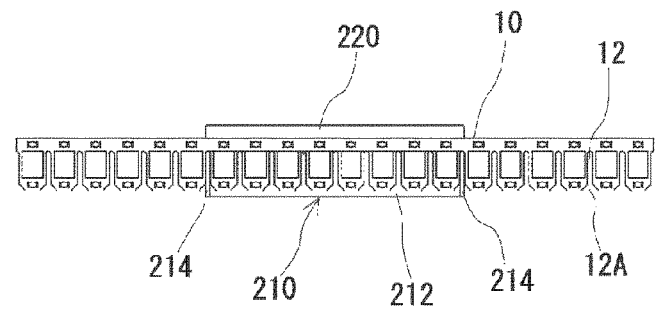
FIG. 7A and FIG. 7C are diagrams useful in explaining the operation of the apparatus for taking out flattened tube fins according to the first embodiment.
Figure 7C:
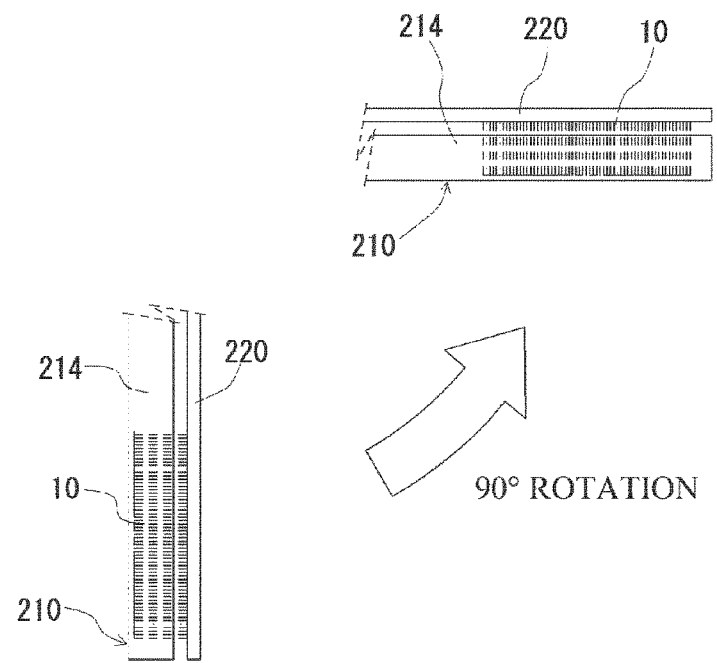

After this, as depicted in FIG. 7C, the control unit controls the operation of the moving mechanism 230 so as to rotate the first member 210 and the second member 220 by 90° so that the openings 12A of the cutaway portions 12 of the flattened tube fins 10 face downward.

Figure 8A:
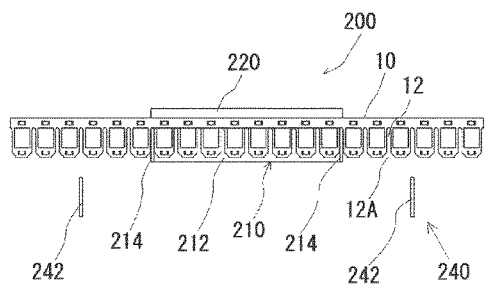
FIG. 8A and FIG. 8C are diagrams useful in explaining the operation of the apparatus for taking out flattened tube fins according to the first embodiment.
Figure 8C:
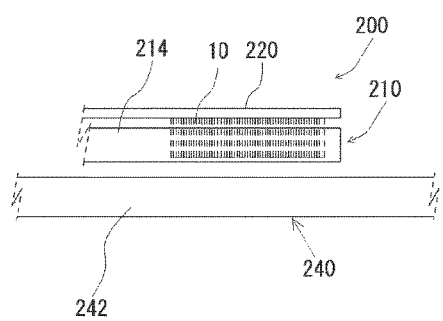

However, as depicted in FIG. 8A and FIG. 8C, the apparatus 200 for taking out flattened tube fins according to the present embodiment further includes accumulating unit 240 disposed at a different position to the position where the stacker apparatus 100 is disposed. Here, the accumulating unit 240 is constructed of two guide members 242 that are disposed so as to be positioned at the positions of two cutaway portions 12 aside from the cutaway portions 12 into which the erected portions 214 of the first member 210 have advanced. As depicted in FIG. 8A and FIG. 8C, the two guide members 242 are disposed so as to correspond to cutaway portions 12 positioned at positions outside the erected positions of the erected portions 214 of the first member 210. In the same way as the erected portions 214 of the first member 210, the parts of these guide members 242 that advance into the cutaway portions 12 should preferably be formed with the same shape when viewed from above as the shape of the cutaway portions 12 when viewed from above.

Figure 9A:
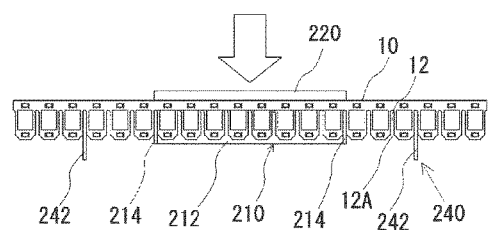
FIG. 9A and FIG. 9C are diagrams useful in explaining the operation of the apparatus for taking out flattened tube fins according to the first embodiment.
Figure 9C:
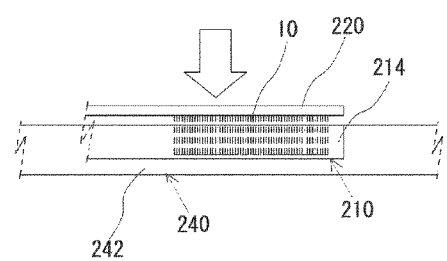
Figure 10A:
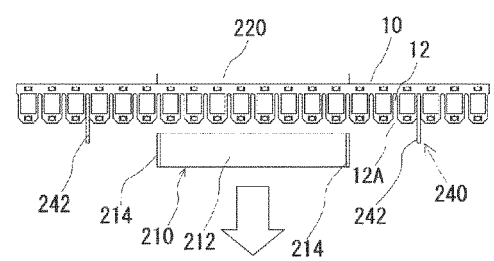
FIG. 10A and FIG. 10C are diagrams useful in explaining the operation of the apparatus for taking out flattened tube fins according to the first embodiment.
Figure 10C:
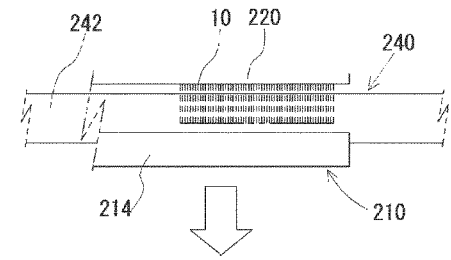

As depicted in FIG. 7A and FIG. 7C, once the openings 12A of the cutaway portions 12 of the flattened tube fins 10 face downward, as depicted in FIG. 8A and FIG. 8C, the control unit controls the operation of the moving mechanism 230 so that the first member 210 and the second member 220 move from the position of the stacker apparatus 100 to the position of the accumulating unit 240. Next, as depicted in FIG. 9A and FIG. 9C, the control unit controls the operation of the moving mechanism 230 so that the guide members 242 of the accumulating unit 240 advance (i.e., are inserted) into other cutaway portions 12 into which the erected portions 214 have not advanced. As depicted in FIG. 9A and FIG. 9C, after the guide members 242 have advanced into predetermined cutaway portions 12 of the flattened tube fins 10, as depicted by the arrows in FIG. 10A and FIG. 10C, the control unit controls the operation of the moving mechanism 230 so that the first member 210 becomes separated from the flattened tube fins 10 and the accumulating unit 240 (the guide members 242).

In this way, while continuing to press down the flattened tube fins 10 using the second member 220, the erected portions 214 of the first member 210 are pulled out from the cutaway portions 12, which causes the guide members 242 of the accumulating unit 240 to advance into predetermined cutaway portions 12. This makes it possible to transfer a predetermined number of flattened tube fins 10 from the apparatus 200 for taking out flattened tube fins to the accumulating unit 240 without collapsing the stacked state.

Figure 11A:
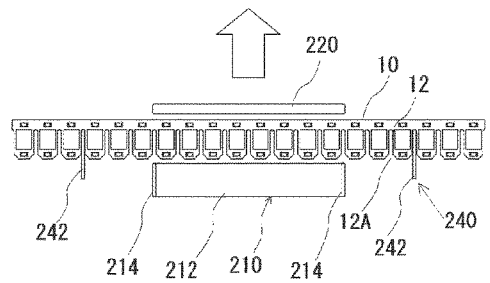
FIG. 11A and FIG. 11C are diagrams useful in explaining the operation of the apparatus for taking out flattened tube fins according to the first embodiment.
Figure 11C:
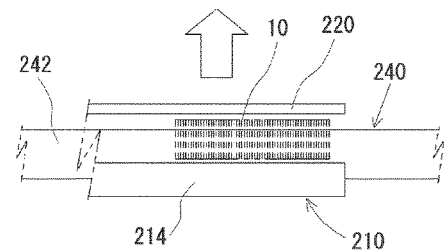
Figure 12A:
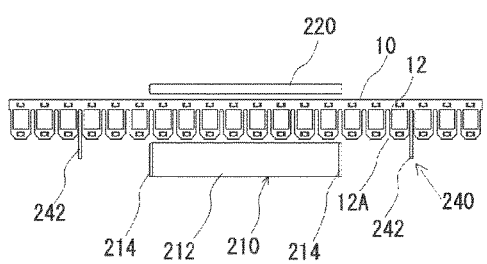
FIG. 12A and FIG. 12C are diagrams useful in explaining the operation of the apparatus for taking out flattened tube fins according to the first embodiment.
Figure 12C:
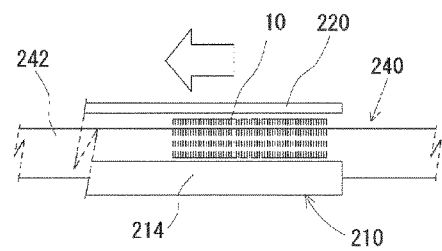

After this, the control unit controls the operation of the moving mechanism 230 so that as depicted by the arrows in FIG. 11A and FIG. 11C, the second member 220 is separated from the joining portions 18 to the flattened tube fins 10, and as depicted by the arrows in FIG. 12A and FIG. 12C, the first member 210 and the second member 220 are returned to the standby positions depicted in FIG. 2A to FIG. 2C. By doing so, the transferring of a predetermined number of flattened tube fins 10 that were stacked and held in the stacker apparatus 100 to the accumulating unit 240 is completed.

The length in the length direction of the guide members 242 is formed at a length that several times the height of the stacker pins 104 of the stacker apparatus 100. By doing so, it is possible to transfer flattened tube fins 10 stacked in the stacker apparatus 100 to the accumulating unit 240 a plurality of times. The specific length in the length direction of the guide members 242 can be set as appropriate in keeping with the number of flattened tube fins 10 used in a heat exchanger.

The control unit repeatedly executes the operation described above until a predetermined number of flattened tube fins 10 have been accumulated on the guide members 242 of the accumulating unit 240. In this way, after a predetermined number, which is set in advance, of flattened tube fins 10 have been accumulated on the guide members 242 of the accumulating unit 240, the accumulating unit 240 is sent together with the flattened tube fins 10 to an assembly process of a heat exchanger.

Second Embodiment

In the first embodiment, a process until the plurality of flattened tube fins 10 stacked and held in the stacker apparatus 100 are transferred to the accumulating unit 240 is described. Also, although a configuration where the guide members 242 of the accumulating unit 240 are several times the length of the stacker pins 104 of the stacker apparatus 100 has been described above, no explanation has been given about the flattened tube fins 10 transferred to the accumulating unit 240 sliding along the guide members 242.

For this reason, it is assumed that the apparatus 200 for taking out flattened tube fins according to the present embodiment includes the configuration of the apparatus 200 for taking out flattened tube fins according to the first embodiment and additionally includes a grouping unit 244 that causes the flattened tube fins 10 to slide on the accumulating unit 240.

Note that in the present embodiment, since it is possible, aside from the configuration of the accumulating unit 240, to use the same configuration as the first embodiment, detailed description is omitted here. Also, since the process up to the transferring of a plurality of flattened tube fins 10 that are stacked in the stacker apparatus 100 to the accumulating unit 240 using the apparatus 200 for taking out flattened tube fins can be executed with the same process as the first embodiment, detailed description is omitted here.

Figure 13A:
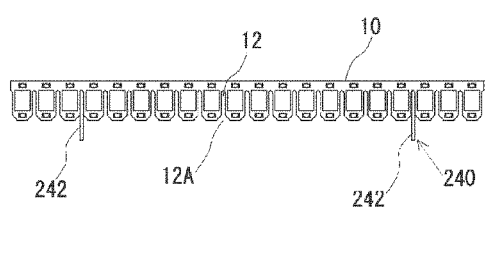
FIG. 13A and FIG. 13C are diagrams useful in explaining the operation of a grouping unit in an accumulating unit of an apparatus for taking out flattened tube fins according to a second embodiment.
Figure 13C:
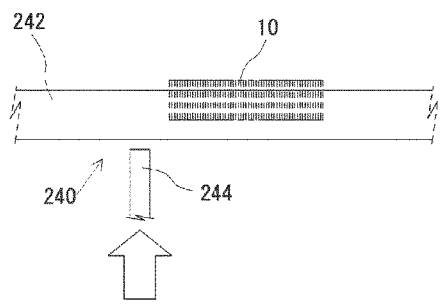
Figure 14:
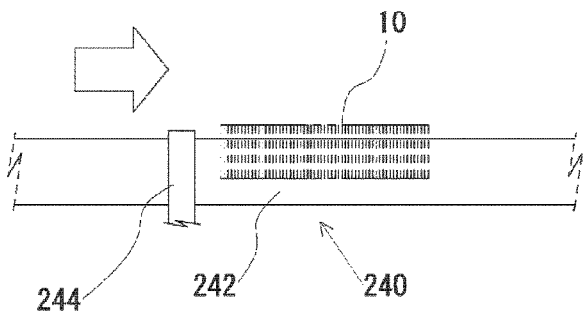
FIG. 14 is a diagram useful in explaining the operation of the grouping unit in the accumulating unit of the apparatus for taking out flattened tube fins according to the second embodiment.
Figure 15:
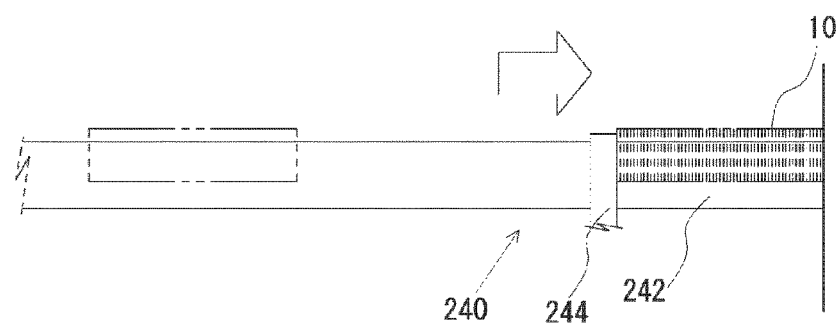
FIG. 15 is a diagram useful in explaining the operation of the grouping unit in the accumulating unit of the apparatus for taking out flattened tube fins according to the second embodiment.
Figure 16:
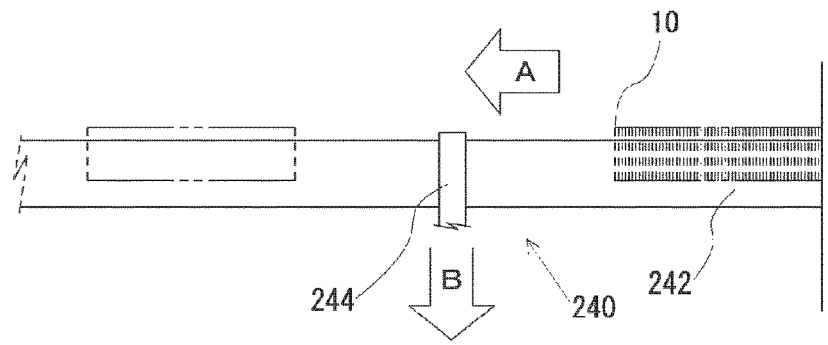
FIG. 16 is a diagram useful in explaining the operation of the grouping unit in the accumulating unit of the apparatus for taking out flattened tube fins according to the second embodiment.

The grouping unit 244 constructs part of the accumulating unit 240 and causes the plurality of flattened tube fins 10 that have been transferred to the guide members 242 to slide in the length direction of the guide members 242 so that a second and following transferring operation that transfers the flattened tube fins 10 from the stacker apparatus 100 are executed smoothly. The specific operation of the grouping unit will now be described with reference to FIG. 13A, FIG. 13C, FIG. 14, FIG. 15, and FIG. 16. FIG. 13A is a diagram where the accumulating unit is viewed in a length direction of the guide members and FIG. 13C is a diagram where the view in FIG. 13A is viewed from a direction that is perpendicular on a horizontal plane. The drawings in FIG. 14 to FIG. 16 are diagrams corresponding to FIG. 13C.

As depicted in FIG. 13A and FIG. 13C, the accumulating unit 240 according to the present embodiment includes the grouping unit 244 for grouping the plurality of flattened tube fins 10 that have been transferred to the guide members 242 at one end in the length direction of the guide members 242.

The grouping unit 244 according to the present embodiment is capable of being formed by two block members disposed so as to sandwich the guide members 242. The grouping unit 244 is connected to a moving mechanism, not illustrated, so that the grouping unit 244 is capable of moving in an arbitrary direction relative to the guide members 242. The grouping unit 244 may also be connected to the moving mechanism 230 that moves the first member 210 and the second member 220.

As depicted in FIG. 13C, the grouping unit 244 has a position below the guide members 242 as a standby position. When flattened tube fins 10 have been transferred from the apparatus 200 for taking out flattened tube fins to the guide members 242, the control unit controls the operation of the moving mechanism 230 so that the grouping unit 244 is caused to move in the direction of the arrow in FIG. 13C.

After the grouping unit 244 has moved to a height position where the guide members 242 are sandwiched as depicted in FIG. 14, the control unit controls the moving mechanism 230 so that the grouping unit 244 is moved in the direction of the arrow in FIG. 14, resulting in the plurality of flattened tube fins 10 held on the guide members 242 being caused to slide along the length direction of the guide members 242 by the grouping unit 244.

When the flattened tube fins 10 held on the guide members 242 have slid to the predetermined position depicted in FIG. 15 (one end of the guide members 242), the control unit controls the operation of the moving mechanism 230 so that after the grouping unit 244 has moved in the direction of the arrow A in FIG. 16, the grouping unit 244 is then moved in the direction of the arrow B in FIG. 16 to return the grouping unit 244 to the standby position. In this way, after the sliding of the flattened tube fins 10 held on the guide members 242 by the grouping unit 244 has been completed, the grouping unit 244 returns to the standby position in a two-stage movement.

This moving operation (withdrawing operation) of the grouping unit 244 to the standby position of the grouping unit 244 is especially favorable when a compressing force acts in the stacking direction (the length direction of the guide members 242) of the flattened tube fins 10, especially during a second and following sliding operation of the flattened tube fins 10. More specifically, this withdrawing operation has the intention of preventing damage, such as deformation of the flattened tube fins 10 due to a collision with the grouping unit 244 during a withdrawing operation, when the compressing force that acted on the flattened tube fins 10 becomes released due to the grouping unit 244 being withdrawn and the flattened tube fins 10 relax.

After the grouping unit 244 has returns to the standby position, the operation described above is repeated by the control unit until a predetermined number of flattened tube fins 10 have been moved to the guide members 242. The control unit controls the operation of the moving mechanism 230 so that the amount by which the flattened tube fins 10 are slid by the grouping unit 244 gradually decreases in keeping with the number of flattened tube fins 10 that have been transferred to the guide members 242. More specifically, the control unit controls the operation of the moving mechanism 230 so that the sliding completion position of the grouping unit 244 depicted in FIG. 15 gradually moves to the left. Note that the dot-dot-dash lines in FIG. 15 and FIG. 16 depict the position immediately after the flattened tube fins 10 have been transferred to the guide members 242.

As described above, a plurality of flattened tube fins 10 stacked on the stacker apparatus 100 are supplied in a plurality of operations to the guide members 242 of the accumulating unit 240. When a number, which has been set in advance, of flattened tube fins 10 have been supplied to the accumulating unit 240, the control unit operates a notification means, not illustrated, to notify the operator of the completion of accumulation. Separately to this, the control unit may control the operation of the moving mechanism 230 to transfer the flattened tube fins 10 held in the apparatus 200 for taking out flattened tube fins to another accumulating unit 240.

Although the present invention has been described above based on embodiments, the present invention is not limited to the above embodiments and it should be obvious that various modifications can be made within a range that does not depart from the spirit of the invention. For example, although the apparatus 200 for taking out flattened tube fins according to the embodiments described above has been described by way of an example configuration including the accumulating unit 240, the accumulating unit 240 is not an essential configuration. When the configuration of the accumulating unit 240 is omitted, the apparatus 200 for taking out flattened tube fins may perform a process that feeds the flattened tube fins 10 taken out from the stacker apparatus 100 to the next process.

Also, in the embodiments described above, although an example arrangement where the spacers 106 disposed on the upper surface of the base 102 are used as a stacking start position restricting portion has been described, the present invention is not limited to this arrangement. The stacking start position restricting portion can be constructed of a flange portion formed by disposing a plate member at an intermediate height position of the stacker pins 104 by welding or the like.

In addition, although embodiments given above have been described by way of an example configuration where the first member 210 is formed in a U shape when viewed from the front due to the base plate 212 and the erected portions 214 that are erected at both end positions in the width direction of the first member 210, the first member 210 is not limited to having this configuration. As one example, it is possible to use a configuration where the erected portions 214 are erected at intermediate positions in the width direction of the base plate 212 in the form of an inverted U shape (like the character "pi"). When doing so, the erected positions of the erected portions 214 may be aligned with the positions of cutaway portions 12 through which the stacker pins 104 are not passed, out of the cutaway portions 12 of the flattened tube fins 10 stacked and held on the stacker apparatus 100.

In addition, although an example configuration where the flattened tube fins 10 that are stacked and held on the stacker apparatus 100 are pulled out by the first member 210 and the second member 220 moving in synchronization as depicted in FIG. 6A to FIG. 6C has been described, the present invention is not limited to the operation depicted in FIG. 6A to FIG. 6C. For example, after the state depicted in FIG. 5A to FIG. 5C, the control unit may move the stacker apparatus 100 so as to become separated from the first member 210 and the second member 220. In this case, a moving mechanism in the form of a fluid moving mechanism or a motor moving mechanism is disposed for the stacker apparatus 100 also. That is, the first member 210 and second member 220 and the stacker apparatus 100 may be caused to move apart after the flattened tube fins 10 have been clamped by the first member 210 and the second member 220.

Also, although a configuration where the grouping unit 244 in the second embodiment is composed of two blocks has been described, so long as it is possible to avoid interference with the guide members 242, it is also possible to use a configuration where the grouping unit 244 is constructed of one block. With this configuration, a block that has been formed into a concave shape is used and the grouping unit 244 may stand by in a state where the concave part faces an upper or lower position of the guide members 242.

In addition, it is possible to use an apparatus 200 for taking out flattened tube fins that is an appropriate combination of the various configurations described above.

What is claimed is:

1. An apparatus for taking out flattened tube fins that takes out stacked flattened tube fins, in which a plurality of cutaway portions into which flattened tubes used for heat exchanging are inserted, are formed from one side toward another side in a width direction, from a stacker apparatus, the stacker apparatus stacking the flattened tube fins and including a base portion, stacker pins that are erected on an upper surface of the base and inserted through the cutaway portions, and a stacking start position regulating portion for stacking the flattened tube fins from a position that is separated from an upper surface of the base portion, the apparatus for taking out flattened tube fins comprising:
a first member including a base plate and an erected portion that is erected on the base plate in a state where the erected portion is positioned at at least an opening-side position of a cutaway portion, out of any of the cutaway portions aside from positions of the stacker pins;
a second member disposed at a position that faces the first member with the flattened tube fins stacked in the stacker apparatus in between and together with the first member clamps the flattened tube fins stacked on the stacker apparatus; and
a moving mechanism that causes the first member and the second member to move toward and away from the flattened tube fins stacked on the stacker apparatus and moves the flattened tube fins and the stacker apparatus apart in a state where the flattened tube fins stacked on the stacker apparatus are clamped by the first member and the second member,
wherein by moving the first member so that the base plate advances into a position between the base and the stacking start position regulating portion and the erected portion advances into an opening-side position of a cutaway portion and by moving the second member in a direction that approaches the first member, the moving mechanism clamps the flattened tube fins stacked on the stacker apparatus between the first member and the second member and then moves the first member and the second member along a direction in which the stacker pins are erected.

2. An apparatus for taking out flattened tube fins that takes out stacked flattened tube fins, in which a plurality of cutaway portions into which flattened tubes used for heat exchanging are inserted, are formed from one side toward another side in a width direction, from a stacker apparatus, the stacker apparatus stacking the flattened tube fins and including a base portion, stacker pins that are erected on an upper surface of the base and inserted through the cutaway portions, and a stacking start position regulating portion for stacking the flattened tube fins from a position that is separated from an upper surface of the base portion, the apparatus for taking out flattened tube fins comprising:
a first member including a base plate and an erected portion that is erected on the base plate in a state where the erected portion is positioned at at least an opening-side position of a cutaway portion, out of any of the cutaway portions aside from positions of the stacker pins;

a second member disposed at a position that faces the first member with the flattened tube fins stacked in the stacker apparatus in between and together with the first member clamps the flattened tube fins stacked on the stacker apparatus; and a moving mechanism that causes the first member and the second member to move toward and away from the flattened tube fins stacked on the stacker apparatus and moves the flattened tube fins and the stacker apparatus apart in a state where the flattened tube fins stacked on the stacker apparatus are clamped by the first member and the second member; and an accumulating unit including at least two guides that are positioned at formation positions of the cutaway portions of the flattened tube fins, are capable of advancing into the cutaway portions, and are disposed at positions that do not interfere with the erected portion, wherein the moving mechanism moves the flattened tube fins clamped between the first member and the second member in a stacked state to a position of the accumulating unit, causes the flattened tube fins to rotate so that opening sides of the cutaway portions of the flattened tube fins face the guides so as to allow the guides to advance into the cutaway portions of the flattened tube fins clamped in the stacked state by the first member and the second member and causes the guides to advance into the cutaway portions of the flattened tube fins, and then causes the first member and the second member to relatively move apart.

3. The apparatus for taking out flattened tube fins according to claim 1, further comprising an accumulating unit including at least two guides that are positioned at formation positions of the cutaway portions of the flattened tube fins, are capable of advancing into the cutaway portions, and are disposed at positions that do not interfere with the erected portion, wherein the moving mechanism moves the flattened tube fins clamped between the first member and the second member in a stacked state to a position of the accumulating unit, causes the flattened tube fins to rotate so that opening sides of the cutaway portions of the flattened tube fins face the guides so as to allow the guides to advance into the cutaway portions of the flattened tube fins clamped in the stacked state by the first member and the second member and causes the guides to advance into the cutaway portions of the flattened tube fins, and then causes the first member and the second member to relatively move apart.

* * * * *